US00RE38340E

(19) United States
(12) Reissued Patent
Hao

(10) Patent Number: US RE38,340 E
(45) Date of Reissued Patent: Dec. 2, 2003

(54) MULTI-POINT BENDING OF BARS DURING FABRICATION OF MAGNETIC RECORDING HEADS

(75) Inventor: Shanlin X. Hao, Eden Prairie, MN (US)

(73) Assignee: Seagate Technology LLC, Scotts Valley, CA (US)

(21) Appl. No.: 09/951,165

(22) PCT Filed: Dec. 13, 1996

(86) PCT No.: PCT/US96/20088

§ 371 (c)(1),
(2), (4) Date: Dec. 13, 1996

Related U.S. Patent Documents

Reissue of:
(64) Patent No.: 5,951,371
Issued: Sep. 14, 1999
Appl. No.: 08/765,139
Filed: Dec. 13, 1996

U.S. Applications:
(60) Provisional application No. 60/030,276, filed on Nov. 4, 1996.

(51) Int. Cl.[7] ..... B24B 1/00; B24B 49/00; B24B 51/00

(52) U.S. Cl. ..... 451/5; 29/603; 29/593; 451/28; 451/259

(58) Field of Search ..... 29/603.12, 593, 29/603; 324/226; 451/11, 28, 1, 10, 5, 9, 259, 272, 273, 177, 276, 389, 179, 446, 285, 287, 289

(56) References Cited

U.S. PATENT DOCUMENTS 3,821,815 A * 6/1974 Abbott et al. ..... 360/110.2
4,457,114 A * 7/1984 Hennenfent et al. ..... 51/216 R
4,471,579 A * 9/1984 Bovensiepen ..... 51/165.73
4,477,968 A * 10/1984 Kracke et al. ..... 29/603
4,517,041 A * 5/1985 Hennenfent et al. ..... 165/155
4,536,992 A * 8/1985 Hennenfent et al. ..... 51/109 R
4,559,743 A * 12/1985 Kracke et al. ..... 51/165 R
4,675,986 A * 6/1987 Yen ..... 29/603
4,689,877 A * 9/1987 Church ..... 29/603
4,850,157 A * 7/1989 Holmstrand ..... 51/128
4,891,914 A 1/1990 Pierrat ..... 51/105 R
4,912,883 A * 4/1990 Chang et al. ..... 51/165 R
4,914,868 A * 4/1990 Church et al. ..... 51/165.71
5,023,991 A * 6/1991 Smith ..... 29/603
5,095,613 A * 3/1992 Hussinger et al. ..... 29/603

(List continued on next page.)

OTHER PUBLICATIONS

"Use of Microelectronic Test Structures to Characterize IC Materials, Processes, and Processing Equipment", by G.P. Carver et al., *Electron Devices Division, National Bureau of Standards, Washington, D.C.**

"MSL 315 Multiple Station Lapping System for Thin–Film or MR Recording Heads", *Total Automation, Inc.**

*Primary Examiner*—Timothy V. Eley
(74) *Attorney, Agent, or Firm*—Westman, Champlin & Kelly, P.A.

(57) ABSTRACT

A device for lapping a bar of the type which carries a plurality of sliders used in magnetic storage systems includes first, second and third actuators adapted to couple to the bar, and impart a first, second and third controllable force in response to a first, second and third control signal, respectively. An arm couples to the first, second and third actuators and applies a lapping force to the bar which presses the bar against a lapping surface thereby causing material to be removed from the bar. A controller provides the first, second and third control signals to the first, second and third actuators, respectively, to impart a plurality of forces onto the bar. The actuators are controlled to obtain a desired profile of the bar and to obtain a desired distribution of the lapping force across the profile of the bar.

43 Claims, 5 Drawing Sheets

U.S. PATENT DOCUMENTS 5,117,589 A * 6/1992 Bischoff et al. ..... 51/216
5,175,938 A * 1/1993 Smith ..... 33/567
5,203,119 A * 4/1993 Cole ..... 51/165.77
5,317,837 A * 6/1994 Stahli ..... 51/165.77
5,333,314 A 7/1994 Masai et al. ..... 395/600
5,333,413 A * 8/1994 Hashimoto
5,335,458 A * 8/1994 Stoffers et al. ..... 51/317
5,361,547 A * 11/1994 Church et al. ..... 451/5
5,386,666 A * 2/1995 Cole ..... 451/5
5,452,166 A * 9/1995 Aylwin et al. ..... 360/126
5,463,805 A * 11/1995 Mowry et al. ..... 29/603
5,478,270 A 12/1995 Cuomo et al. ..... 451/5
5,494,473 A * 2/1996 Dupuis et al. ..... 451/1
5,525,091 A * 6/1996 Lam et al. ..... 451/1
5,597,340 A * 1/1997 Church et al. ..... 451/5
5,607,340 A * 3/1997 Lackey et al. ..... 451/5
5,620,356 A 4/1997 Lackey et al. ..... 451/5
5,695,387 A * 12/1997 Moravec et al. ..... 451/56
5,713,123 A * 2/1998 Toyoda et al. ..... 29/603.12
5,720,845 A * 2/1998 Liu ..... 165/345
5,722,155 A * 3/1998 Stover et al. ..... 29/603.1
5,738,568 A * 4/1998 Jurjevic et al. ..... 451/41
5,749,769 A * 5/1998 Church et al. ..... 451/5

* cited by examiner

MULTI-POINT BENDING OF BARS DURING FABRICATION OF MAGNETIC RECORDING HEADS

Matter enclosed in heavy brackets [ ] appears in the original patent but forms no part of this reissue specification; matter printed in italics indicates the additions made by reissue.

The present invention claims the benefit of earlier filed U.S. Provisional Application No. 60/030,276, entitled MULTI-POINT BENDING TOOL (CARRIER) FOR ULTRA-PRECISION MACHINING filed on Nov. 4, 1996

BACKGROUND OF THE INVENTION

The present invention relates generally to the fabrication of magnetoresistive (MR) and inductive recording sensors or transducers for data storage application. More specifically, the present invention relates to a method and apparatus for bending a bar which carries a plurality of sliders at multiple points during the fabrication process and specifically during the lapping process.

During the fabrication of magnetic heads for use in magnetic data storage applications, an array of transducers are fabricating on a common substrate (also called a wafer) by depositing a plurality of layers onto a surface of the substrate. The array of transducers are patterned using, for example, a photolithographic process in combination with various etching and liftoff processes. The finished substrate or wafer is then optically and/or electrically inspected and subsequently cut into smaller arrays, typically a plurality of bars, i.e. rows of transducers. Next, the individual rows or bars of transducers are machined or "lapped" to obtain a desired dimension. (Lapping is a material removal process described below in more detail.) For MR transducers, this dimension is sometimes referred to as stripe height (SH) and for inductive transducers this dimension is sometimes referred to as throat height (TH). Often, electrical lap guides (ELGs, described below) are deposited upon the same substrate and are used as sensors during the lapping process. Following the lapping process, the recording heads are diced to produce individual transducers or heads which are used to form sliders. These sliders are used to read back and/or write information onto a surface of a magnetic disc, for example, which moves at a high rate of rotation.

In order to establish adequate performance for high efficiency recording heads, it is necessary to achieve the desired strip height or throat height. There are many factors which affect variations in the ultimate stripe height or throat height. These factors include variations in the position and size of elements induced during wafer processing. The step of slicing the substrate into bars can also introduce variations. Mounting induced thermal stress can also cause variations during the processing of the wafers into sliders. Further, the profile of the lapping surface can lead to variations.

Electrical lapping guides (ELGs) are sensors which are deposited onto the wafer during the fabrication process. The output from the ELGs can be used to determine when to stop the lapping process. Typically, the ELGs are fabricated along with the transducers using the same wafer processing steps. This is described, for example, in U.S. Pat. No. 4,477,968 which issued Oct. 23, 1984 and U.S. Pat. No. 4,559,743 which issued Dec. 24, 1985.

Lapping generally refers to machining processes in which material is very slowly, at a controllable rate, removed from a surface. Typically, the process involved applying a work surface of the work piece to a moving surface which is slightly abrasive. One such device is described in U.S. Pat. No. 4,536,992 which issued Aug. 27, 1985. Thus, by controlling the lapping process in response to the output from the ELGs, a closed loop machining process is set up in which the output from the ELGs are used as feedback to the lapping machine.

During the lapping process, the slider is held on a carrier which attaches to the arm of the lapping apparatus. Such a carrier is described in U.S. Pat. No. 4,457,114 which issued Jul. 3, 1984. The carrier in U.S. Pat. No. 4,457,114 uses two actuators to bend the bar during the lapping process. In U.S. Pat. No. 4,457,114, the carrier provides bending of the bar at both ends around the center of the bar. This bending is used to provide non-uniform removal of material from the bar in order to compensate for variations in the bar and the throat height or stripe height of the sensor. In U.S. Pat. No. 4,457,114, the actuators comprises pins which are heated to thereby expand and apply a force to the bar which bends the bar. A variation on this technique is to use three different actuators to apply force to a bar at three different points.

Generally, the prior art has focused on improved ELGs and lapping mechanisms. However, as the data storage industry is continuously driven to higher and higher densities and in an ongoing effort to reduce costs of fabrication, a number of competing factors are observed. First, the sensor height tolerance requirement is getting smaller. Second, the density of heads carried on each bar is getting larger. Third, the aspect ratio of the length to the thickness of each bar is getting larger. Therefore, existing lapping and bending systems are often inadequate for controlling the lapping process. These factors not only lead to heads which are more sensitive to processing induced disturbances, but also lead to bars which are more easily disturbed because they are thinner and the stiffness of the bar is related to the cube of its thickness.

SUMMARY OF THE INVENTION

The present invention includes a lapping apparatus which provides improved control during the lapping process. In one embodiment, a device for lapping a bar which carries a plurality of sliders includes a first actuator adapted to couple to the bar and to impart a first controllable force in response to a first control signal and a second actuator adapted to couple to the bar through the actuators and applies a lapping force to the bar and against the lapping surface. A controller provides first and second control signals to the first and second actuators, respectively, to thereby impart a plurality of forces on the bar. The forces are selected to obtain a desired profile of the bar and to obtain a desired distribution of the lapping surface across the profile of the bar.

In one embodiment, seven different actuators are used to provide seven separate control points for bending of the bar.

DETAILED DESCRIPTION OF THE PREFERRED EMBODIMENTS

Figure 1:
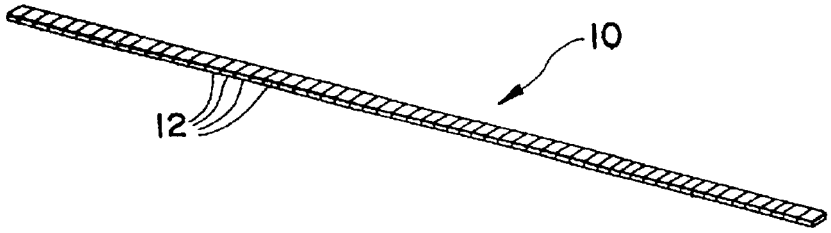
FIG. 1 is a perspective view of a head carrying bar of the type used in the present invention.

The present invention provides a method and apparatus for accurately lapping a bar carrying a plurality of heads of the type used to write and/or read back information from the surface of a magnetic storage disc. FIG. 1 is a perspective view of bar 10 which carries a plurality of heads 12. The dimensions of head 12 are significant and it has been known to use a lapping process to obtain the desired dimensions. As described in the Background section, lapping is a controlled material removal process in which a work surface of bar 10 is pressed against a moving, abrasive surface to thereby selectively and controllably remove material from bar 10. This lapping is performed using a lapping machine which includes an arm, a lapping surface and a carrier which couples bar 10 to the arm. The arm presses the bar against the lapping surface to thereby cause material to be removed from bar 10.

It has been known in the prior art to control the profile of the carrier. This control is used to more accurately control the material removal. Specifically, as illustrated by FIG. 1, bar 10 is an elongated element which may bend or have deformities. By controlling the profile of carrier used to hold bar 10 during lapping, it is possible to compensate for these bends or deformations.

Figure 2:
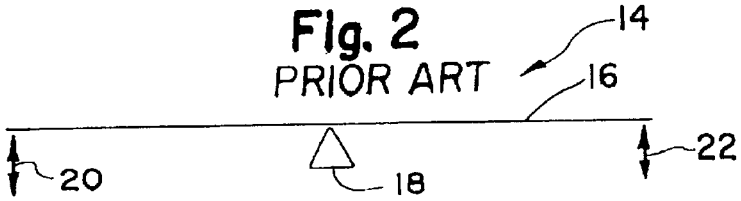
Fig. 2 PRIOR ART
FIG. 2 is a simplified schematic diagram of a prior art carrier having two actuated points and a fixed point.
Figure 3:
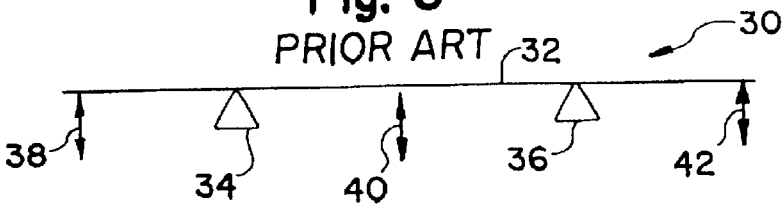
Fig. 3 PRIOR ART
FIG. 3 is a simplified schematic diagram of a prior art carrier having three actuated control points and two fixed control points.

FIG. 2 is a simplified schematic diagram of a prior art carrier 14 having a profile 16. In FIG. 2, fulcrum 18 represents a fixed portion of carrier 14 and bi-directional arrows 20 and 22 represent actuators at either end of profile 16. Profile 16 is adapted to couple to a bar, such as bar 10. FIG. 2 is similar to the carrier described in U.S. Pat. No. 4,457,114, issued Jul. 3, 1984. Thus, carrier 14 provides limited control of profile 16 such that variations in bar 10 can be compensated. FIG. 3 is a simplified schematic diagram of another prior art carrier 30. Carrier 30 has a carrier profile 32 which is coupled to fixed control points or fulcrums 34 and 36 and actuators which control actuated control points represented by bi-directional arrows 38, 40 and 42.

One aspect of the present invention includes the recognition that there are two parameters which must be controlled during lapping. These parameters are bending of the bar profile and balancing of the force applied to the bar. Bending of the bar refers to adjusting the profile of the bar such that the bar becomes relatively straight (or is otherwise shaped as desired). Balancing, on the other hand, is the distribution of pressure across the bar. For example, in the prior art design of FIG. 3, balancing is determined by the relative positions of fulcrums 34 and 36. The actuators represented by arrows 38, 40 and 42 are used to control the shape of the bar profile.

Another aspect of the present invention includes the recognition that the use of additional control points on a carrier can be used to provide more accurate control of a bar during a lapping process. The present invention includes determination of the number of control points needed to achieve a desired degree of control for a bar having a desired length. For example, given a bar profile for I bars defined by J data pints, $x_{ij}$, $y_{ij}$ where i=1, 2, . . . I, and j=1, 2, . . . J. A polynomial curve fit function is formed using a least squares fit analysis:

$$\bar{y}_{ij}=f(a_1, a_2 \ldots, a_k, x_{ij}) \qquad \text{Eq. 1}$$

where k equals 2, 3, . . . and is the order of the curve and a, $a_2$, . . . are the coefficients of the curve. Next, the root mean square (RMS) of the residuals for each k are calculated according to the following formula:

$$RMS_k = \sqrt{\frac{1}{IJ-1}\sum_{i,j}(y_{ij}-\bar{y}_{ij})^2} \qquad \text{Eq. 2}$$

Using Equation 2, the number of control points (k) required to achieve the desired amount of control can be determined by assuming that a $(k-1)^{th}$ order curve can be bent straight and setting $RMS_k$ to the desired minimum variation in the bar profile. One can then calculate the necessary order of the RMS curve fit which also provides the number of control points. For example, if $RMS_k$ is less than 1 pinch Equation 2 is solved with k equal to 10. This analysis has been verified experimentally using carriers having five control points over a 2 inch long bar and five control points over a 1 inch long bar. The standard deviation of the 2 inch long bar was 2.3 $\mu$inch while the standard deviation of the 1 inch long bar was 0.78 $\mu$inches. This leads to the conclusion that nine control points is sufficient to obtain a variation of less than 1 $\mu$inch in the finished bar profile for a standard 2 inch long bar. Table 1 shows that between 9 and 10 control points are needed to achieve control to within 1 $\mu$inch in a 2 inch bar.

TABLE 1

| Curve Fit Parameter # | RMS of residuals between individual point and curve on each bar: mean | median | 75% | 90% | RMS over 15 × 24 points | STD measure = 1.67 $\mu$inch |
|---|---|---|---|---|---|---|
| 2 | 39.32 | 33.44 | 60.28 | 72.85 | 46.67 | 46.64 |
| 3 | 19.87 | 13.59 | 27.57 | 46.91 | 25.13 | 25.07 |
| 4 | 8.96 | 6.54 | 10.96 | 18.78 | 11.4 | 11.28 |
| 5 | 6.06 | 4.48 | 6.54 | 9.63 | 7.5 | 7.31 |
| 6 | 4.67 | 3.39 | 5.77 | 8.63 | 5.6 | 5.35 |
| 7 | 3.21 | 2.57 | 3.82 | 7.26 | 3.62 | 3.21 |
| 8 | 2.56 | 2.23 | 2.97 | 4.66 | 2.82 | 2.27 |
| 9 | 2.09 | 2.02 | 2.61 | 2.98 | 2.19 | 1.42 |
| 10 | 1.69 | 1.62 | 2.01 | 2.78 | 1.74 | 0.49 |

Figure 4:
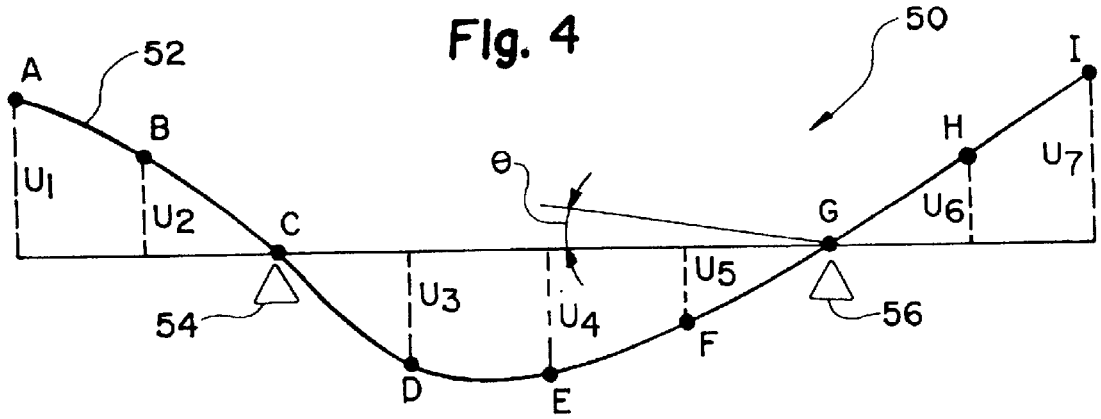
FIG. 4 is a simplified schematic diagram showing a carrier in accordance with one embodiment of the present invention.

FIG. 4 is a simplified schematic diagram of a carrier 50 in accordance with one embodiment of the present invention. Carrier 50 is shown with profile 52 having control points A, B, C, D, E, F, G, H and I. Control points A, B, D, E, F, H and I are coupled to actuators (not shown in FIG. 4) while control points C and G are stationary fulcrums 54 and 56, respectively. In FIG. 4, control point A is shown actuated a distance of $U_1$, control point B is shown actuated distance $U_2$, control point D is shown actuated distance $U_3$, control point E is shown actuated distance $U_4$, control point F is shown actuated a distance $U_5$, control point H is shown actuated a distance $U_6$ and control point I is shown actuated a distance $U_7$. Thus, there are nine separate control points shown in FIG. 4 of which seven are individually actuated and two are fixed. This provides eight different segments to profile 52 which can be controlled, segments A-B, B-C, C-D, D-E, E-F, F-G, G-H and H-I. The slope θ of a line passing through control points C and G can be used to control balance of carrier 50 and the distribution of the lapping force across profile 52. During operation, the actuators which couple to points A, B, D, E, F, H and I are preferably controlled such that profile 50 is a substantially straight line.

Figure 5:
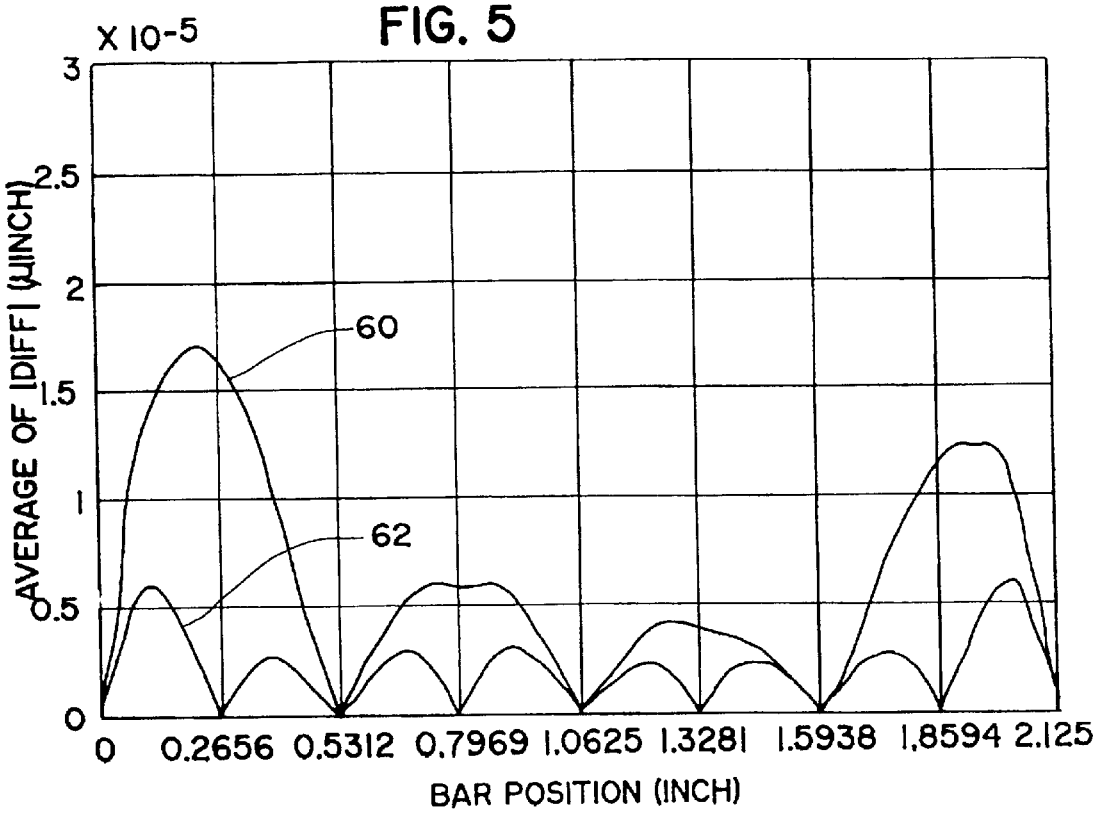
FIG. 5 is a graph showing deflection for the carrier of FIG. 3 and the carrier of FIG. 4.

FIG. 5 is a comparison of deflection using a prior art three-point bending carrier such as shown in FIG. 3 and a seven-point bending carrier such as shown in FIG. 4. FIG. 5 is a graph showing the average difference between a deformed carrier shape and a bar bow at various positions along the length of the bar. Line 60 is for a three-point carrier and line 62 is for a seven-point carrier. The graph of FIG. 5 was calculated using a finite element method (FEM) modeling technique. As shown in FIG. 5, the three-point bending allows substantial variation to the profile, particularly between the end point actuators (i.e., between 34 and 38 and between 36 and 42 shown in FIG. 3.)

Figure 6A:
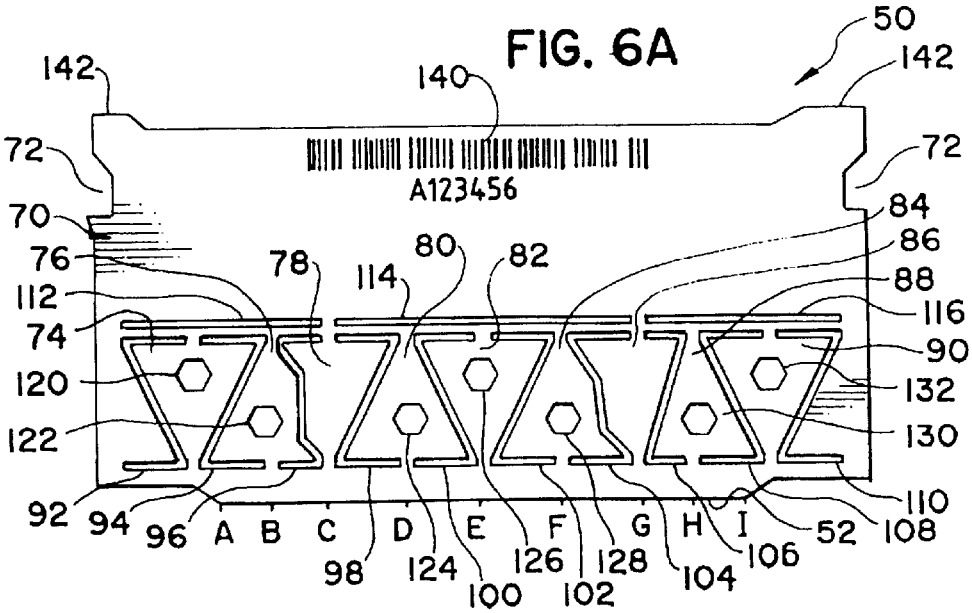
FIG. 6A is a front plan view and FIG. 6B is a top perspective view, respectively, of a carrier in accordance with one embodiment of the invention having nine control points.
Figure 6B:
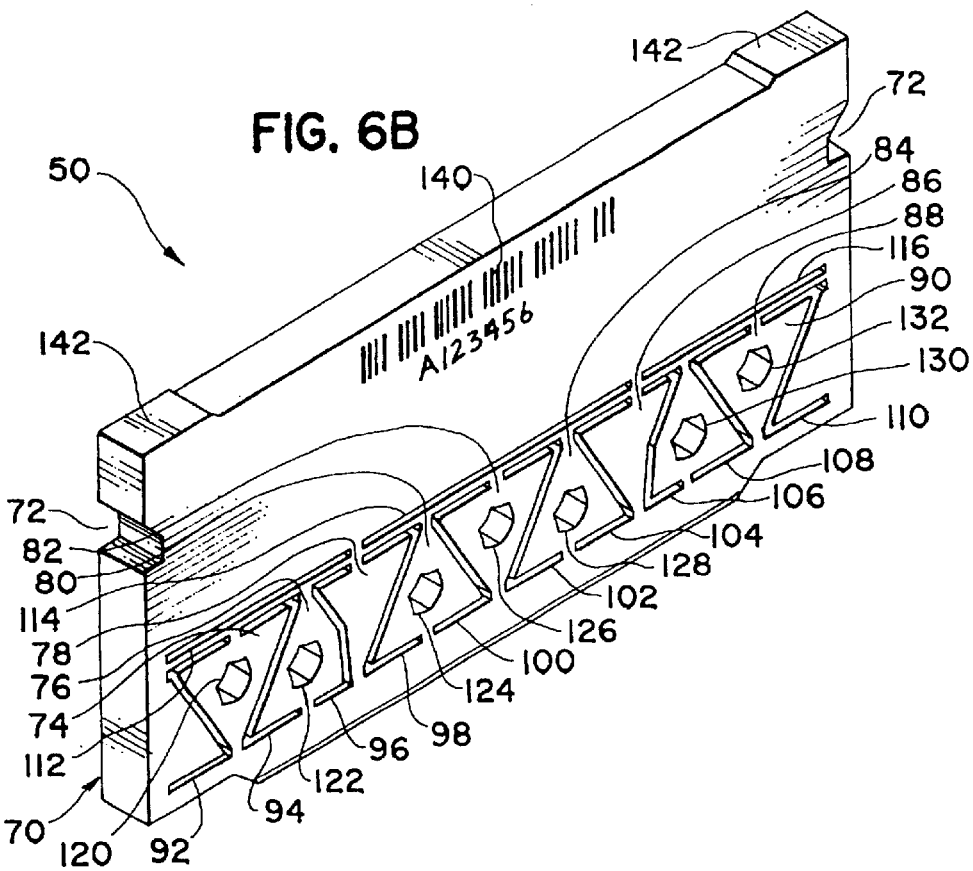

FIG. 6A is a front plan view and FIG. 6B is a top perspective view of carrier 50 in accordance with one embodiment of the present invention. Carrier 50 includes main body 70 having detents 72 formed therein and presenting carrier profile 52. Profile 52 includes control points A–I. Nine control areas 74, 76, 78, 80, 82, 84, 86, 88 and 90 are formed in main body 70 adjacent control points A–I, respectively. Control areas 74–90 are defined by regions of reduced strength in main body 70 formed by cutouts 92, 94, 96, 98, 100, 102, 104 106, 108 and 110. Further, plate spring cutouts 112, 114 and 116 are positioned parallel to and opposite profile 52. Actuator couplings 120, 122, 124, 126, 128, 130 and 132 are positioned within control areas 74, 76, 80, 82, 84, 88 and 90, respectively. Main body 70 may also optionally carry bar code information 140. The design of carrier 50 in FIGS. 6A and 6B is selected based upon the design goal of balancing structure bending stiffness while achieving the desired bar bow correction requirements based upon available bending capacity (load and travel) of the actuators.

In operation, actuators (not shown in FIGS. 6A and 6B) are adapted to couple to actuator couplings 120–132 to control the profile 52 as desired. Using control area 74 as an example, cutouts 92 and 94 allow vertical movement which is transferred to control point A. Furthermore, control area 78 controls control point C. The cutout portions 92–110 have a shape selected to reduce the coupling to adjacent control areas. However, control area 78 is more closely coupled to main body 70 because of the spacing between parallel spring cutouts 112 and 114. This is also true for control area 86 with respect to cutouts 114 and 116. Thus, control areas 78 and 86 provide stationary control points or fulcrums 54 and 56, respectively, shown in FIG. 4. Another aspect of the present invention is the vertical offset between adjacent actuator couplings 120 and 122, for example. This offset allows the actuator couplings to be more closely spaced thus allowing additional control points and therefore greater control. Further, cutouts 96 and 104 are staggered to further improve spacing. Plate spring cutouts 112, 114 and 116 provide a plate spring parallel mechanism which yields more linear bending on the bar and reduces off-plane displacement due to the lapping force or an off center bending force. Cutouts 112, 114 and 116 reduce the amount of twisting motion which could be imparted to profile 52 due to the lapping force of the lapping surface as it is moved past profile 52.

Another aspect of the present invention includes the use non-uniform spacing between control points in order to improve control or more evenly distribute control. For example, referring back to FIG. 5, the deflection between the two end points in graph 62 indicates that the maximum variation occurs between points A and B and points H and I. Therefore, rather than uniformly distributing the control points, the design of FIGS. 6A and 6B has reduced spacing between side control points (i.e., sections A-B, B-C, G-H and H-I) than that of the middle control points (i.e., sections C-D, D-E, E-F and F-G). This spacing may be adjusted as appropriate to achieve either a uniform distribution or any desired distribution. Detents 72 are used to clamp carrier 50 to the arm of the lapping device. Registration sections 142 provide a reference surface for the lapping arm during the lapping process. In one preferred embodiment, carrier 50 is formed of white TZP Zirconia ceramic which allows for easy maintenance. The bar code 140 can be used to track carrier 50 and/or an associated bar carried on profile 52 during the machining process.

Figure 7:
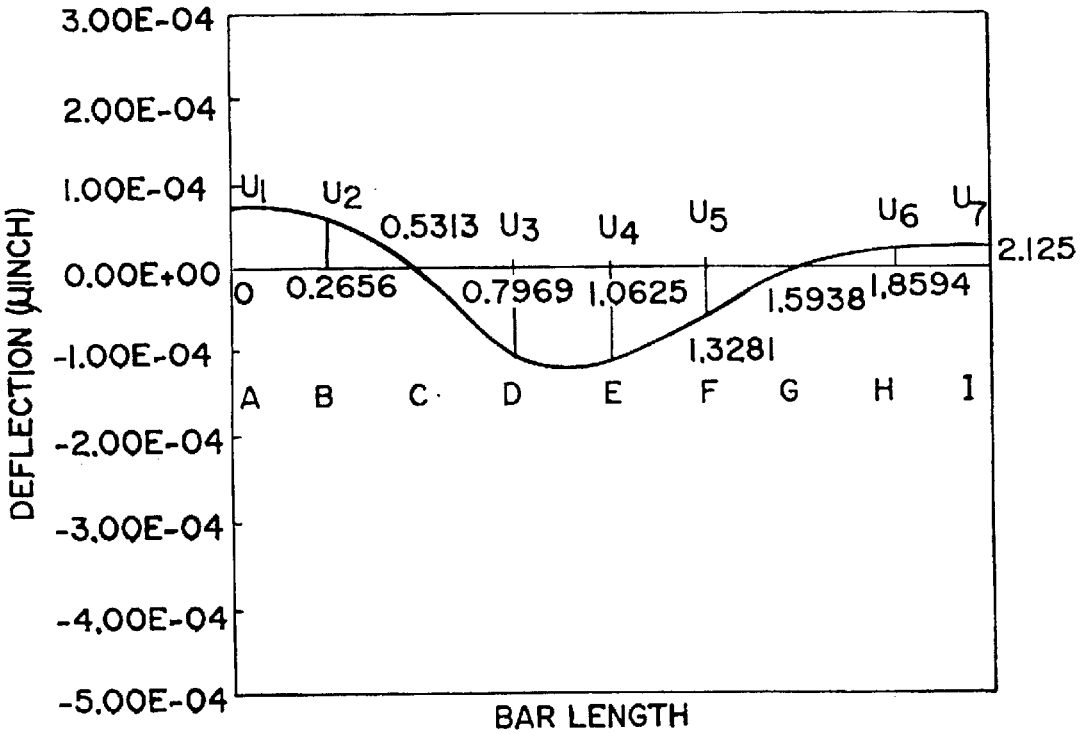
FIG. 7 is a graph showing deflection versus position of a carrier in accordance with the present invention having a single control point actuated.

One aspect of the present invention includes characterizing the carrier for subsequent use during the lapping process. FIG. 7 is a graph based upon FEM modeling which shows the response of profile 52 when point D is actuated through actuator coupling 124. FIG. 7 is a graph of deflection versus bar length. FIG. 7 shows that the individual bending control points are closely coupled together in the present invention. Note that this is in contrast to the prior art designs shown in FIGS. 2 and 3 in which the points are spaced further apart and each actuated control point is separated by a fixed control point. Thus, in the present invention, the movement of a single control point significantly alters the entire profile of the carrier. Therefore, in order to actively control the bending of the bar during the lapping process, an accurate transfer function must be determined which describes the carrier response to different loading situations. This transfer function may be defined as a matrix. Assume that: $\overline{F}$=[F1, F2, . . . F7] is the applied bending forces on the carrier 50 at each control point, and $\overline{U}$=[U1, U2, . . . U7] is the resulting displacement of profile 52 for each of the control points A–I, respectively. A sensitivity matrix $\overline{K}$ can be generated according to the formula:

$$\overline{K}\cdot\overline{F}=\overline{U} \qquad \text{Eq. 3}$$

where:

$$K = \begin{bmatrix} k11 & k12 & k13 & & k17 \\ k21 & k22 & & & k27 \\ k31 & & & & \\ & & & \cdots & \\ k71 & k72 & & & k77 \end{bmatrix}$$

The sensitivity matrix $\overline{K}$ defines the behavior of profile 52 in response to forces applied at each of the actuator coupling points 120–132. The major diagonal components in $\overline{K}$ describe the direct effect of forces applied at individual bending points. The off-diagonal components in $\overline{K}$ describe the coupling effect between the various points.

The sensitivity matrix $\overline{K}$ can be established by quantifying the carrier displacement response to individually applied known bending forces. This may be performed either through actual experimental measurements or using FEM modeling techniques. During the lapping process, the equation is solved in reverse. First, the normalized bar bow profile is formed using ELG feedback information. The profile of the bar is leveled using balancing of the fixed control points. The carrier deflection required to bend the bar straight is calculated in accordance with the equation:

$$\overline{U}=[U1, U2, \ldots U7] \quad \text{Eq. 5}$$

Where U1–U7 represent a flat profile. Next, equation 3 is solved for $\overline{F}$:

$$\overline{F}=[F1, F2, \ldots F7] \quad \text{Eq. 6}$$

Where F1–F7 are the forces which must be applied by each actuator to achieve the desired profile described by $\overline{U}$.

Figure 8:
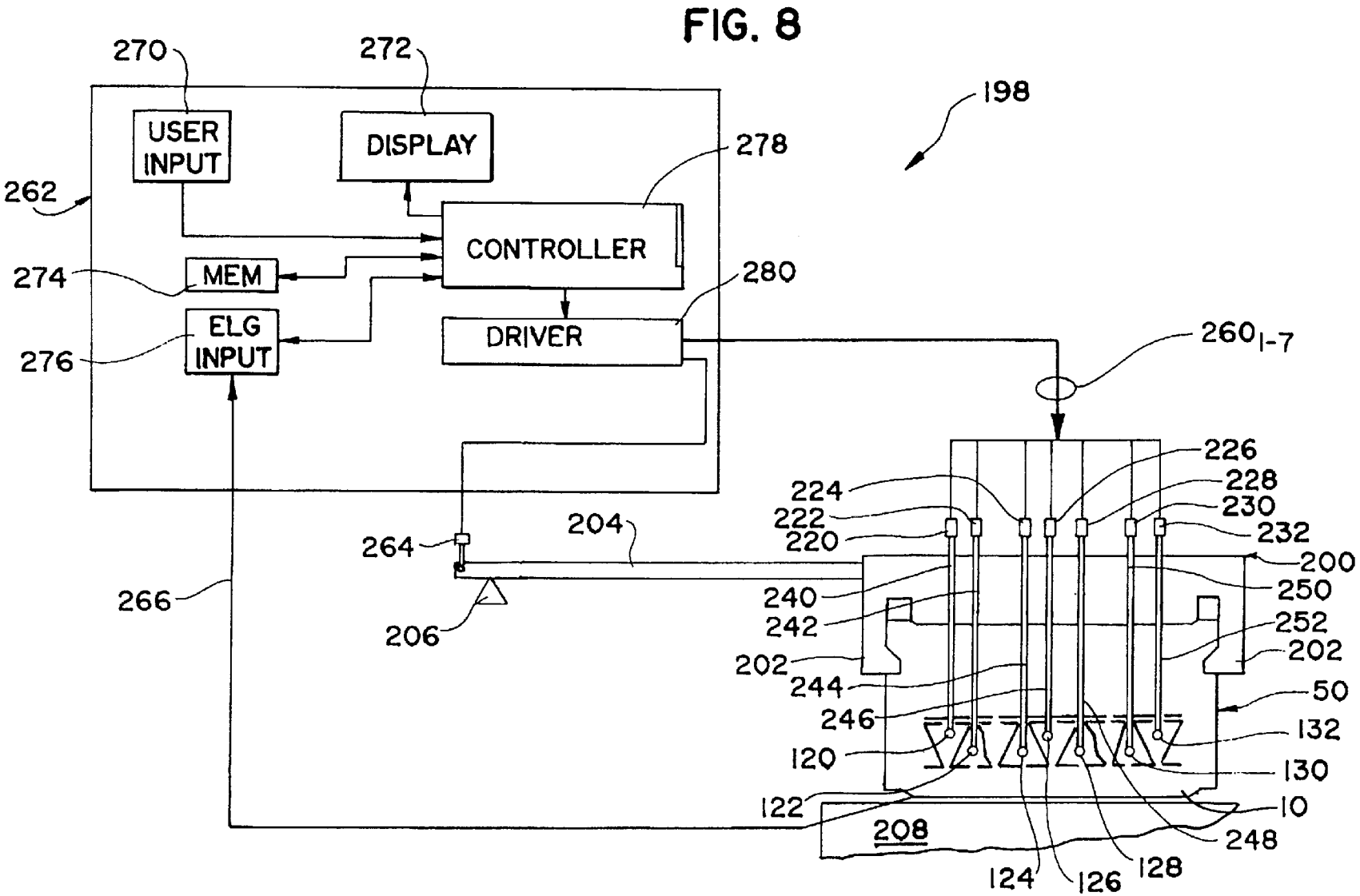
FIG. 8 is a simplified diagram of a lapping system in accordance with the present invention.

FIG. 8 is a simplified diagram showing a lapping system 98 in accordance with the present invention. Lapping system 198 includes armature 200 having clamps 202 which are adapted to clamp to carrier 50 at detents 72. Armature 200 is carried on elongated arm 204 which couples to fulcrum 206. Armature 200 is positioned whereby bar 10 which couples to carrier 50 is in contract with a lapping surface 208. Armature 200 carriers actuators 220, 222, 224, 226, 228, 230 and 232 which couples to couplings 220–232 through actuator armatures 240, 242, 244, 246, 248, 250 and 252, respectively. Actuators 220–232 receive control signals through control lines $\mathbf{260}_{1\text{-}7}$ from control system 262. Armature 200 also couples to balancing actuator 264 which is positioned opposite carrier 50 relative to fulcrum 206. Actuator 264 also couples to control system 262. A feedback connection 266 is provided from electronic lapping guides (ELGs) carrier on bar 10. Control system 262 includes a user input 270, such as a keypad, a user output 272, such as an LED display, memory 274, ELG input 276 a controller 278, such as a microprocessor, and an actuator driver.

In operation, the lapping process is controlled by control system 262. Controller 278 retrieves instructions and parameters from memory 274. For example, the matrix of Equation 4 may be stored in memory 274. Instructions and information are received from user input 270 and the status of the lapping process may be displayed on display 272. Additionally, lapping system 198 may include a bar code reader (not shown) to read bar code information 140 for use by controller 278. Feedback regarding the progress of the lapping operation is received through ELG input 276 and provided to controller 278. Controller 278 solves Equation 3 for $\overline{F}$ and responsively controls actuators 220–232 and 264 using driver 280. Driver 280 may comprise, for example, a transistor circuit providing a power output to actuate the actuators. Actuators 220–232 and 264 may be any appropriate actuator which is capable of providing a controlled movement such as a hydraulic system, a voice coil, a pneumatic actuator, a piezo electric system, thermal, magnetorestrictive, etc. Those skilled in the art will recognize that the present invention is not limited to any particular actuator. Actuator 264 is used to provide a balance control to balance distribution of the force applied to bar 10. Actuators 220–232 are used to apply the individual forces of vector $\overline{F}$. The total amount of force applied on bar 10 may be controlled by a weight or another actuator (not shown). As shown in FIG. 8, lapping system 198 provides a closed loop in which the output from the ELG sensors are used as feedback by controller 278 to control actuators 220–232 and 264. Lapping surface 208 may comprise, for example, a rotating disc, the lapping system of FIG. 8 is provided as an example only and the carrier of the present invention may be employed with lapping systems of any appropriate design.

Figure 9:
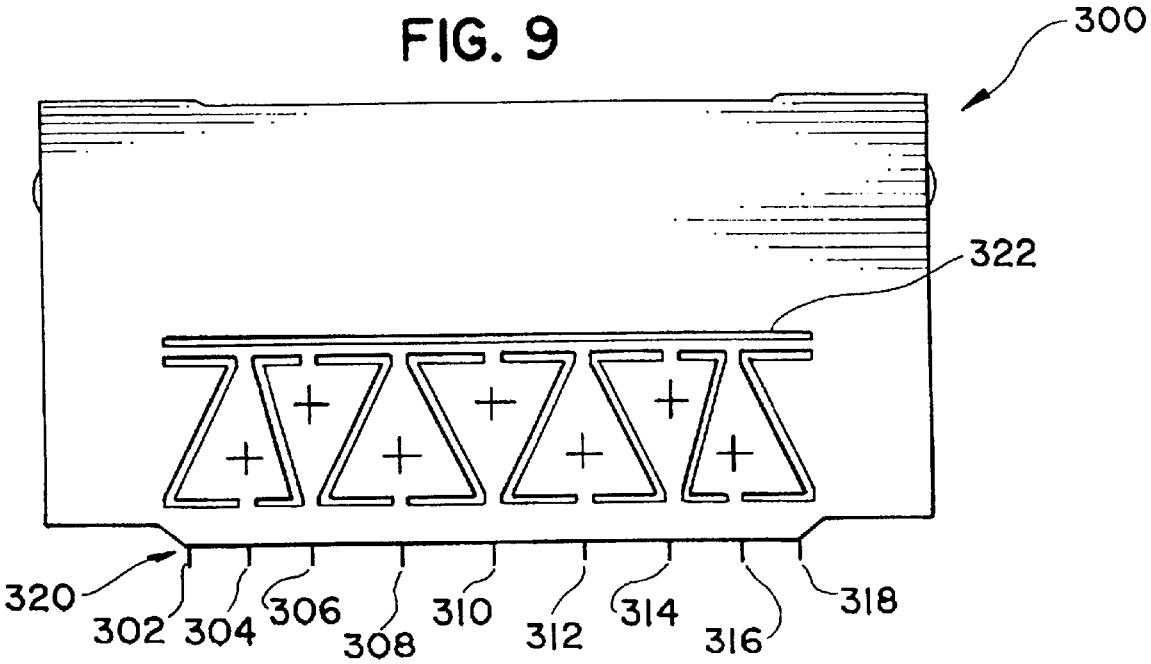
FIG. 9 is a front plan view of a carrier [iii] *in* accordance with another embodiment having seven adjacent actuated control points and fixed control points on either end of a profile of the carrier.

FIG. 9 is a plan view of a carrier 300 in accordance with another embodiment. Carrier 300 provides control points 302, 304, 306, 308, 310, 312, 314, 316 and 318 along profile 320. Carrier 300 is an example of a carrier in accordance with the present invention in which end points 302 and 318 are fixed while control points 304–316 are all individually actuated. Note that this also uses a single cutout 322 to provide the parallel spring mechanism.

Figure 10:
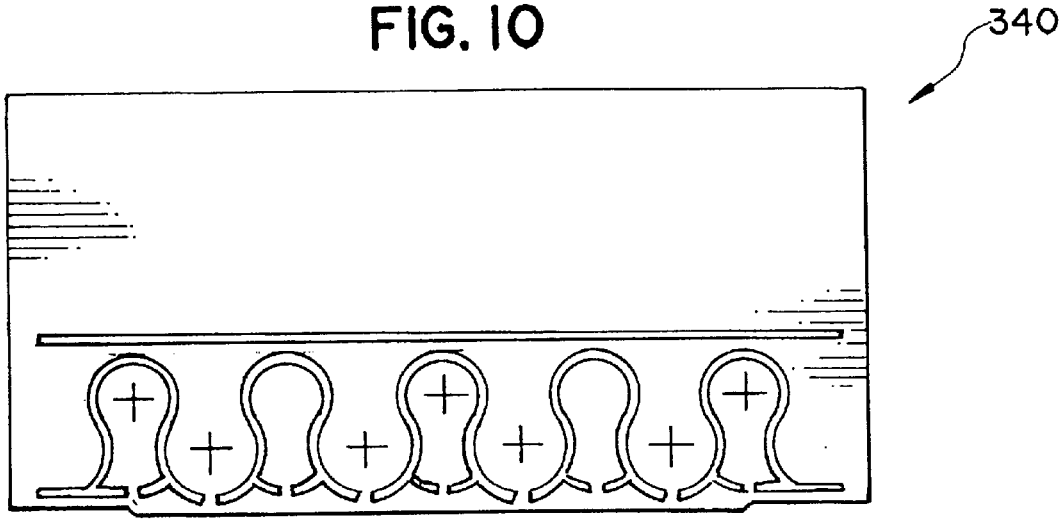
FIG. 10 is a front plan view of a carrier in accordance with another embodiment.

It will be understood that any appropriate orientation of cutouts or other mechanisms to allow relative movement of the control points is within the scope of the present invention. FIG. 10 shows a plan view of a carrier 340 which illustrates another technique for selecting the shape of cutouts in the carrier body. The cutouts in carrier 340 are designed to reduce deflection of the carrier profile due to lapping pressure. Carrier 340 accomplishes this goal by contouring the beam of the cutout. Additionally, the thickness of carrier 340 can be increased to further reduce lapping induced deflection.

The present invention provides a lapping system having a carrier which allows improved control of the bending of a bar during a lapping process. The present invention includes numerous features including an increased number of actuators and closer spacing between actuators. Further, in contrast to prior art designs, in the present invention actuators are placed adjacent one another without an intermediate fixed region. Further, in the present invention, the actuator mechanism is placed on the arm of the lapping machine such that the mechanism need not be placed on each bar. Attachment of the bar to the carrier may be through any appropriate technique. In one embodiment, the bar may be slid into a slot carried on the profile of the carrier. Further, the actuators of the present invention may be used to either push or pull the bar and thereby allow deformations in either direction. Preferably, bending of the bar is centered around the normal profile of the bar. This reduces any extra bending stress placed on the bar during lapping. In one preferred embodiment, the lapping of a 2 inch long bar is controlled to within a standard deviation of less than 1 $\mu$inch using a minimum of nine separate control points, seven for bending and two for balancing the lapping force. This number may be increased or decreased as appropriate based upon the length of the bar and the desired minimum standard deviation. Clamping of the carrier may be through any appropriate technique and is not limited to the specific clamps described herein. Further, the actuators may be coupled too the carrier using other techniques. As used herein, the term "control point" may be either a fixed control point (shown as a fulcrum in the schematic drawings) or an actuated control point.

Although the present invention has been described with reference to preferred embodiments, workers skilled in the art will recognize that changes may be made in form and detail without departing from the spirit and scope of the invention. For example, any number of control points, formed by any appropriate technique, in any type of carrier, actuated or fixed by any means may be used. Further, any type of lapping may be used, and the arm can be integral with the carrier. The control points could also be formed integral with the bar itself. This might require additional connections to the bar.

What is claimed is:

1. A device for lapping a bar carrying a plurality of sliders, comprising:

a first actuator adapted to couple to the bar and impart a first controllable force in response to *a* first control signal;

a second actuator adapted to couple to the bar and impart a second controllable force in response to a second control signal;

a lapping surface;

an arm coupled to the first and second actuators which provides a lapping force to the bar against the lapping surface; and a controller providing the first and second control signals to the first and second actuators, respectively, to impart [a plurality of forces on] *the first and second controllable forces on* the bar selected to obtain a desired profile of the bar and to obtain a desired distribution of the lapping force across the profile of the bar, wherein bending caused by the first actuator interferes with bending caused by the second actuator and the controller determines the *first and second* control signals for the first and second actuators based upon the desired profile of the [control points] *bar* and *an* interrelationship between *the bending caused by* the first and second [control points] *actuators*.

2. The device of claim 1 wherein the first actuator couples to a first control point and the second actuator couples to a second control point adjacent the first control point.

3. The device of claim 1 wherein the controller includes memory which contains a sensitivity matrix describing [a relationship between] the interrelationship between *the bending caused by* the first and second actuators and the *first and second* control signals [is] *are* selected as a further function of the sensitivity matrix.

4. The device of claim 1 including a carrier coupling the arm to the bar and including a first control point coupled to the first actuator and a second control point coupled to the second actuator.

5. The device of claim 4 including a balancing actuator coupled to the controller and wherein the carrier includes at least two fixed control points coupled to the balancing actuator to apply a balancing force to the bar.

6. The device of claim 5 wherein the carrier has first and second opposing ends and the two fixed control points are on the opposing ends of the carrier.

7. The device of claim 5 wherein the carrier includes a third control point coupled to a third actuator and a fourth control point coupled to a [second] *fourth* actuator and wherein the *at least* two fixed control points are separated by at least two *of the first, second, third and fourth* control points.

8. The device of clam 4 wherein the carrier includes a detent and the arm includes a clamp adapted to clamp onto the detent.

9. The device of claim 4 wherein the carrier includes a first control area for coupling to the first actuator and transferring *the first controllable* force to the first control point, the first control area defined by a region of reduced strength in the carrier.

10. The device of claim 9 wherein the region of reduced strength comprises a cutout in the carrier.

11. The device of claim 4 wherein the carrier includes a parallel spring mechanism adapted to reduce deformation of the bar due to movement of the lapping surface.

12. The device of claim 1 wherein the first and second actuators are pneumatic.

13. The device of claim 4 wherein the carrier includes a third control point and a spacing between any pair of adjacent control points is non-uniform.

14. A device for lapping a bar carrying a plurality of sliders comprising:

an arm;

a lapping surface;

a first actuator coupled to the arm;

a second actuator coupled to the arm;

a carrier comprising:

a work surface adapted to couple to the bar and press the bar against the lapping surface;

a first control point on the work surface coupled to the first actuator and positioned to apply a first force to the bar; and a second control point on the work surface adjacent the first control point coupled to the second actuator and positioned to apply a second force to the bar;

wherein the first and second control points are positioned in relatively close proximity such that displacement of the first control point causes significant displacement of the second control point.

15. The device of claim 14 including a controller coupled to the first and second actuators providing control signals to the first and second actuators as a function of a sensitivity matrix which describes a relationship between movement of the first actuator and a resulting movement of the second control point.

16. The device of claim 14 wherein the carrier further comprises first and second fixed control points which control balancing of the bar relative to the lapping surface.

17. The device of claim 16 wherein the fixed control points are on opposing ends of the work surface.

18. The device of claim 16 wherein the carrier further includes third and fourth control points on the work surface and wherein the two fixed control points are separated by at least two *of the first, second, third or fourth* control points.

19. The device of claim 14 wherein the carrier includes a detent and the arm includes a clamp adapted for coupling to the detent.

20. The device of claim 14 wherein the carrier includes a first control area coupling to the first actuator and transferring movement to the first control point, the first control area defined by a region of reduced strength in the carrier.

21. The device of claim 20 wherein the region of reduced strength comprises a cutout region in the carrier.

22. The device of claim 14 wherein the carrier includes a parallel spring mechanism adapted to reduce deformation of the work surface due to movement of the lapping surface.

23. The device of claim 14 wherein the carrier includes a third control point and a spacing between any pair of adjacent control points is non-uniform.

[24. A device for lapping a bar carrying a plurality of sliders, comprising:

an arm;

a lapping surface;

a carrier comprising:

a work surface adapted to couple to the bar and press the bar against the lapping surface; and first, second, third and fourth adjacent control points coupled to the arm and to the work surface;

wherein the first control point is coupled to a first actuator, the second control point is coupled to a second actuator, the third control point is coupled to a third actuator and the fourth control point is coupled to a fourth actuator.]

[25. The device of claim 24, the carrier further comprises a fourth control point and wherein the first and fourth control points are fixed control points and are separated by the second and third control points.]

[26. The device of claim 24 wherein the first carrier further includes a detent and the arm is adapted to clamp to the detent.]

[27. The device of claim 24 including a first control area adapted to transfer movement to the first control point, the first control area defined by a region of reduced strength in the carrier.]

[28. The device of claim 14 or 24 wherein the carrier includes 7 actuated control points and 2 fixed control points.]

*29. A device for lapping a bar carrying a plurality of sliders, comprising:*

*a first actuator adapted to couple to the bar and impart a first controllable force to the bar proximate to a first control point in response to a first control signal;*

*a second actuator adapted to couple to the bar and impart a second controllable force to the bar proximate to a second control point in response to a second control signal;*

*a lapping surface;*

*an arm adapted to support the bar relative to the lapping surface; and*

*a controller providing the first and second control signals to the first and second actuators, respectively, to impart the first and second controllable forces to bend the bar to obtain a desired profile of the bar and a desired distribution of lapping force across a profile of the bar, wherein the first actuator introduces a first bending profile to the bar and the second actuator introduces a second bending profile to the bar and the first and second control signals are selected as a function of an interrelationship of the first bending profile imparted by the first actuator and the second bending profile imparted by the second actuator at the first and second control points.*

*30. The device of claim 29 wherein the controller includes memory which contains a sensitivity matrix describing the interrelationship of the first and second bending profiles imparted by the first and second actuators and the first and second control signals are selected as a further function of the sensitivity matrix.*

*31. The device of claim 29 including a carrier coupling the bar to the arm to support the bar relative to the lapping surface and the first and second actuators are coupled to the carrier.*

*32. The device of claim 29 including a balancing actuator coupled to the controller and the arm.*

*33. The device of claim 29 including a third actuator and a fourth actuator adapted to couple to the bar and adapted to impart third and fourth controllable forces to the bar proximate to third and fourth control points in response to third and fourth control signals and the controller determines the third and fourth control signals based upon the desired profile of the bar and the desired distribution of lapping force across the profile of the bar and the interrelationship of third and fourth bending profiles imparted to the bar by the third and fourth actuators.*

*34. The device of claim 31 wherein the carrier includes a plurality of flexible control areas of reduced strength spaced along a length of the carrier.*

*35. The device of claim 34 wherein the flexible control areas comprise a cutout in the carrier.*

*36. The device of claim 31 wherein the carrier includes a third actuator coupled to the carrier and the first, second and third actuators are non-uniformly spaced along a length of the carrier.*

*37. A device for lapping a bar carrying a plurality of sliders comprising:*

*an arm;*

*a lapping surface;*

*a carrier coupled to the arm and adapted to support the bar relative to the lapping surface; and*

*a plurality of actuators coupled to the carrier proximate to control points 1-n spaced along a length of the carrier and the plurality of actuators adapted to supply a plurality of controllable forces to the bar in response to a plurality of control signals supplied to the plurality of actuators to bend the bar, and the plurality of the control signals being determined to provide a desired profile of the bar and a desired distribution of lapping force along a length of the bar based upon*

$$\begin{bmatrix} K_{11} & K_{1n} \\ K_{n1} & K_{nn} \end{bmatrix} \cdot \begin{bmatrix} F_1 \\ F_n \end{bmatrix} = \begin{bmatrix} U_1 \\ U_n \end{bmatrix}$$

*where*

$$\begin{bmatrix} K_{11} & K_{1n} \\ K_{n1} & K_{nn} \end{bmatrix}$$

*is a sensitivity matrix for the controllable force vs. displacement for control points 1-n where $K_{11}$ to $K_{nn}$ are not equal to zero;*

$$\begin{bmatrix} F_1 \\ F_n \end{bmatrix}$$

*are the controllable forces proximate to the control points 1-n; and*

$$\begin{bmatrix} U_1 \\ U_n \end{bmatrix}$$

*is the displacement proximate to the control points 1-n.*

*38. The device of claim 37 wherein the carrier includes a plurality of areas of reduced strength spaced along the length of the carrier.*

*39. The device of claim 37 wherein the sensitivity matrix is derived experimentally based upon application of known controllable forces.*

*40. The device of claim 37 wherein the device includes at least seven actuators coupled to the carrier.*

*41. The device of claim 37 wherein the sensitivity matrix includes at least three control points spaced along the length of the carrier and the controllable force F proximate to at least one of the three control points equals zero.*

*42. The device of claim 37 wherein the sensitivity matrix includes at least nine control points spaced along the length of the carrier and the controllable force F proximate to at least two of the nine control points equals zero.*

*43. The device of claim 37 wherein the sensitivity matrix includes at least two control points spaced along the length of the carrier where the controllable force F proximate to the at least two control points equals zero to define fulcrum points along the length of the carrier.*

*44. The device of claim 37 wherein the sensitivity matrix is derived using mathematical modeling techniques.*

*45. The device of claim 24 wherein the means for actuating the plurality of actuators based upon the cumulations of the bending profiles of each of the plurality of actuators includes a controller which determines an actuation force for each of the plurality of actuators based upon a sensitivity matrix describing an interrelationship between the bending profiles of each of the plurality of actuators.*

*46. The device of claim 24 wherein the means for actuating the plurality of actuators calculates an actuation force for each of the plurality of actuators based on:*

$$\begin{bmatrix} K_{11} & K_{1n} \\ K_{n1} & K_{nn} \end{bmatrix} \cdot \begin{bmatrix} F_1 \\ F_n \end{bmatrix} = \begin{bmatrix} U_1 \\ U_n \end{bmatrix}$$

*where*

$$\begin{bmatrix} K_{11} & K_{1n} \\ K_{n1} & K_{nn} \end{bmatrix}$$

*is a sensitivity matrix for the actuation force vs. displacement for control points 1-n along a length of the carrier where $K_{11}$ to $K_{nn}$ are not equal to zero;*

$$\begin{bmatrix} F_1 \\ F_n \end{bmatrix}$$

*are the actuation forces proximate to the control points 1-n; and*

$$\begin{bmatrix} U_1 \\ U_n \end{bmatrix}$$

*is the displacement proximate to the control points 1-n.*

*47. A device for lapping a bar carrying a plurality of sliders, comprising:*

*an arm;*

*a lapping surface;*

*a carrier coupled to the arm and adapted to support the bar relative to the lapping surface;*

*a plurality of actuators coupled to the carrier and each of the plurality of actuators adapted to impart a bending profile to the carrier; and*

*means for actuating the plurality of actuators to impart a desired bending profile to a plurality of control points along the carrier based upon a cumulation of the bending profiles of each of the plurality of actuators.*

*48. The device of claim 47 wherein at least seven actuators are coupled to the carrier.*

* * * * *